United States Patent [19]
Rose

[11] 3,879,092
[45] Apr. 22, 1975

[54] SNOWMOBILE TRACK SUSPENSION SYSTEM

[75] Inventor: Edgar Rose, Glencoe, Ill.

[73] Assignee: Outboard Marine Corporation, Waukegan, Ill.

[22] Filed: Dec. 19, 1973

[21] Appl. No.: 426,238

[52] U.S. Cl.................................. 305/24; 180/5 R
[51] Int. Cl............................................. B62d 55/14
[58] Field of Search ............... 305/8, 16, 17, 18, 21, 305/22, 24, 25, 31, 35 EB; 180/5 R, 9.54, 9.50

[56] References Cited
UNITED STATES PATENTS

| | | | |
|---|---|---|---|
| 3,658,392 | 4/1972 | Perreault............................ | 180/5 R |
| 3,701,394 | 10/1972 | Hendrickson...................... | 180/5 R |
| 3,719,242 | 3/1973 | Duclo................................. | 180/5 R |
| 3,720,277 | 3/1973 | Masaoka............................ | 305/24 |
| 3,727,709 | 4/1973 | Newman............................. | 305/24 |

*Primary Examiner*—Philip Goodman
*Assistant Examiner*—John A. Carroll
*Attorney, Agent, or Firm*—Michael, Best & Friedrich

[57] ABSTRACT

Disclosed herein is a snowmobile track suspension comprising a snowmobile chassis, a track suspension assembly including a suspension frame or carriage, a resilient member extending forwardly from the frame from adjacent the forward end thereof, and link means connecting the frame to the snowmobile chassis for movement of the frame relative to the chassis including a rear link pivotally connected to the chassis and means including a sliding connection between the rear link and the frame, and means biasing the suspension assembly for movement of the frame away from the chassis.

15 Claims, 4 Drawing Figures

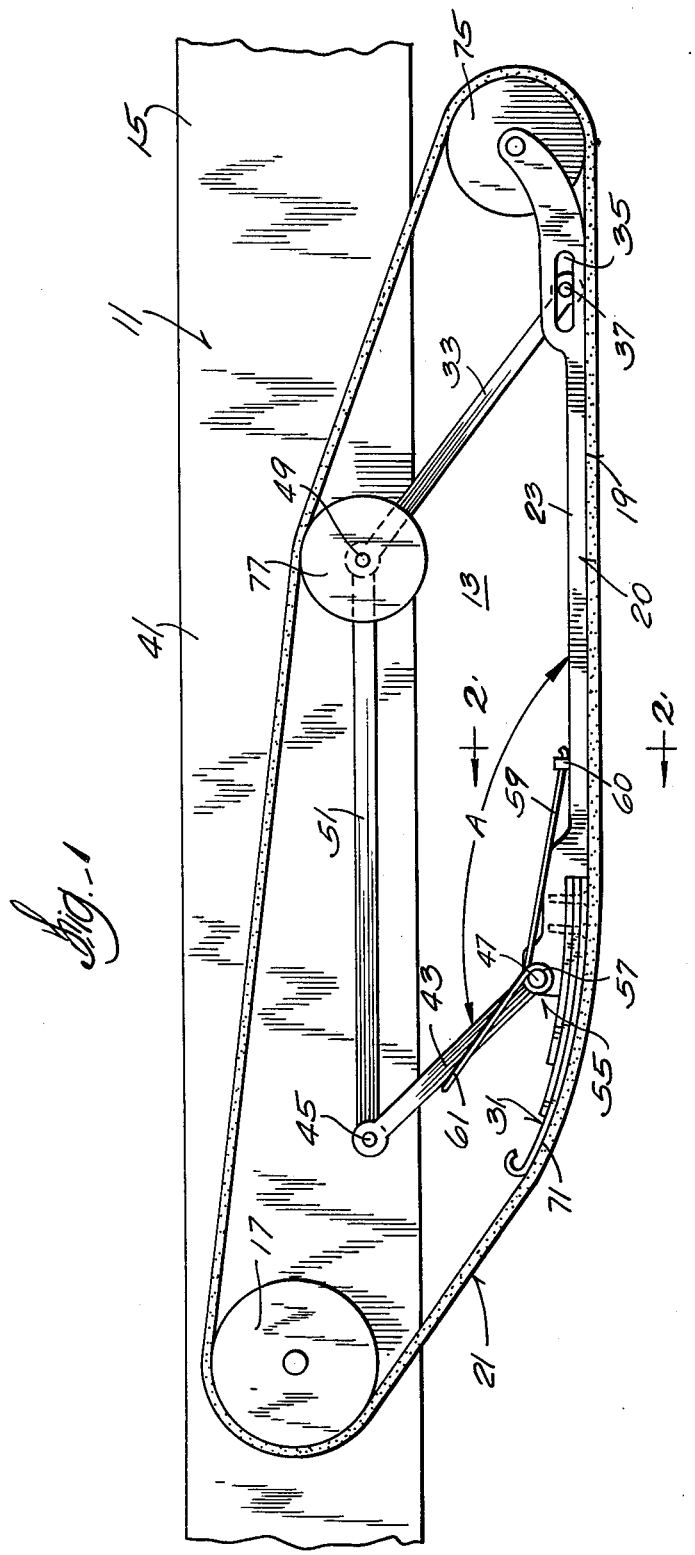
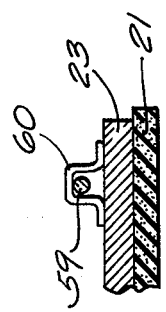

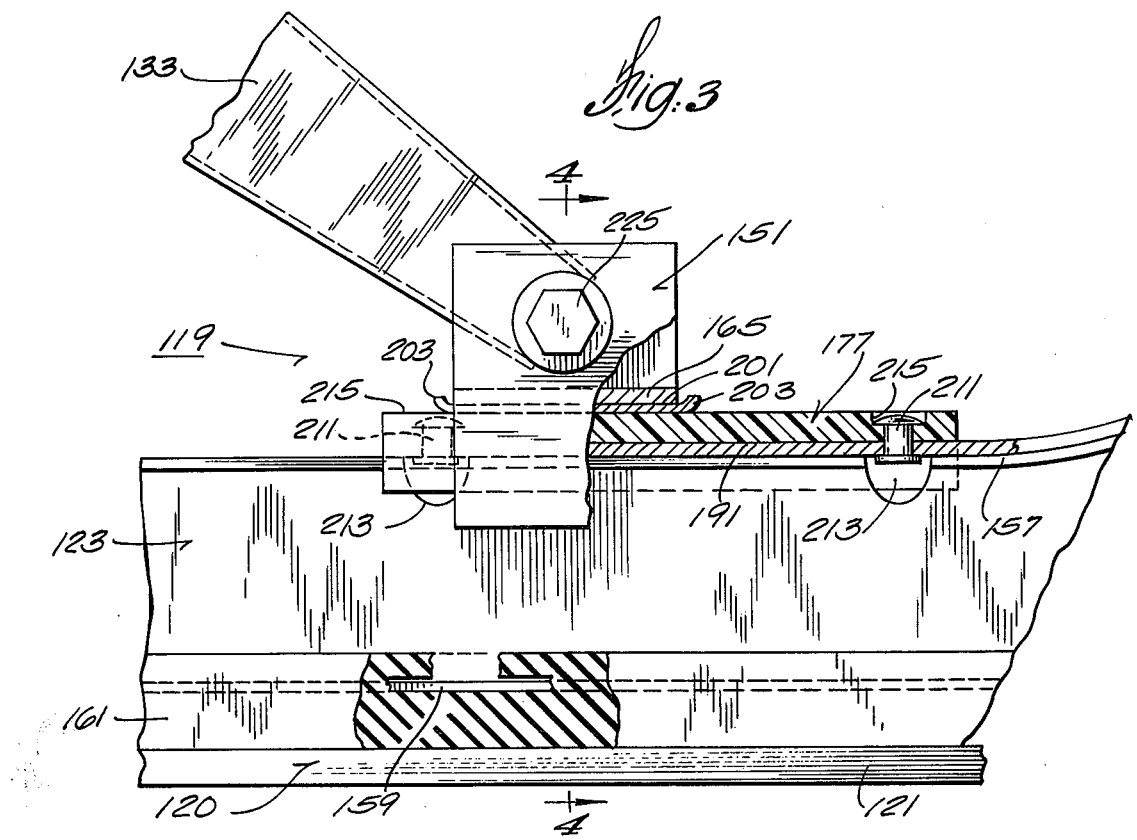
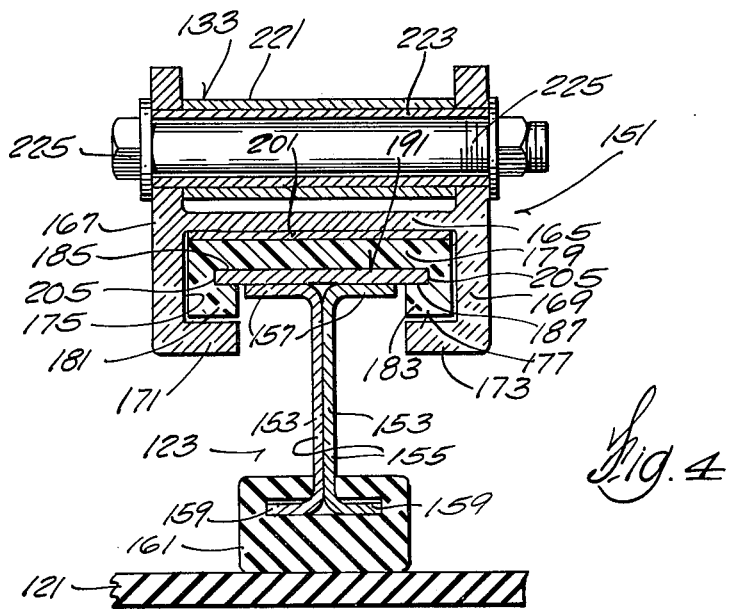

SNOWMOBILE TRACK SUSPENSION SYSTEM

BACKGROUND OF THE INVENTION

This invention relates generally to track suspension systems and more particularly to track suspension systems for snowmobiles and like vehicles.

Attention is directed to the following prior United States patents which disclose snowmobile track suspension systems:

| Swenson et al | 3,485,312 | issued December 23, 1969 |
| Brandli | 3,613,811 | issued October 19, 1971 |
| Skime | 3,690,394 | issued September 12, 1972 |
| Duclo | 3,719,242 | issued March 6, 1973 |

SUMMARY OF THE INVENTION

The invention provides a track suspension assembly including a resilient member which extends forwardly from a suspension frame member, which serves to maintain an endless belt or track under tension notwithstanding variation in track length due, for instance, to temperature change and to variation in the location of the suspension assembly relative to the snowmobile chassis occurring incident to passage over rough terrain, and which further serves to cushion initial impact with obstacles or rough terrain to initiate displacement of the suspension assembly to accommodate movement over such obstacles or rough terrain.

More specifically, the invention provides a snowmobile track suspension comprising a snowmobile chassis, a track suspension assembly including a suspension frame member, a resilient member extending forwardly from the frame member adjacent the forward end thereof, and link means connecting the frame member to the chassis for movement of the frame member relative to the chassis, together with means biasing the suspension assembly for movement of the frame member away from the chassis.

Also in accordance with the invention, there is provided a track suspension comprising a chassis, a track suspension assembly including a suspension frame, and means connecting the suspension frame to the chassis for movement of the suspension frame relative to the chassis and including a link and means connected between the link and one of the chassis and the suspension frame for providing both relative pivotal movement and relative linear movement between the link and the connected one of the chassis and the suspension frame. Also included in the track suspension is means biasing the suspension assembly for movement of the suspension frame away from the chassis.

The use of the resilient member extending forwardly from the suspension frame from adjacent the forward end thereof and the connection of the link to the suspension frame or chassis to provide both relative pivotal and relative linear movement can be used independently of each other or in combination.

One of the principal features of the invention is the provision of a track suspension assembly including a forwardly extending resilient member adapted to maintain track tension and to initiate suspension assembly movement in response to travel over rough terrain.

Another of the principal features of the invention is the provision of a track suspension system including a connection between a suspension link and one of a suspension assembly or chassis, which connection provides both relative pivotal movement and relative linear movement.

Still another of the freatures of the invention is the provision of a snowmobile track suspension system which is economical to construct and which will provide reliable service over a long and useful life.

Other features, objects, and advantages of the invention will become known by reference to the following drawings, general description and claims.

THE DRAWINGS

FIG. 1 is a fragmentary schematic view of a snowmobile suspension system.

FIG. 2 is a sectional view taken along line 2—2 of FIG. 1.

FIG. 3 is a fragmentary view, partially broken away and in section, of the rear portion of a track suspension assembly embodying various of the features of the invention.

FIG. 4 is an enlarged fragmentary sectional view taken along the line 4—4 of FIG. 3.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Fragmentarily and schematically shown in the drawings is a snowmobile 11 including a track suspension system 13 embodying various of the features of the invention. More specifically, the snowmobile 11 includes a frame or chassis 15 to which the suspension system 13 is mounted. Also mounted on the snowmobile 11 is an engine (not shown) which is drivingly connected to a drive sprocket 17 rotatably mounted on the chassis 15 forwardly of the suspension system 13. Trained around the drive sprocket and around a suspension assembly 19 is an endless belt or track 21 which drives the snowmobile 11 along the ground in response to rotation of the drive sprocket 17. Means other than the specific drive sprocket 17 can be used to drive the track 21 and the sprocket 17 could be an idler sprocket if drive were otherwise provided.

The track suspension system 13 comprises the before-mentioned suspension assembly 19 which includes a suspension frame or carriage 20 including a rail or member 23 and link means connecting the member 23 to the chassis for movement of the frame member 23 relative to the chassis 15.. Also included in the suspension system is means for biasing the suspension assembly 19 away from the chassis 15.

In accordance with one feature of the invention, the suspension assembly also includes a resilient member 31 extending forwardly for the carriage or suspension frame 20 from adjacent the forward end thereof and, in accordance with another feature of the invention, one of the links in the link means is connected to one of the carriage 20 and chassis 15 for relative linear and pivotal movement therebetween.

More specifically, the snowmobile chassis 15 can be of any suitable construction including the usual "tunnel" in which the track 21 and track suspension system 13 is mounted. The tunnel is formed, in part, by two generally vertically extending and laterally spaced elongated chassis portions 41, one of which is shown in the drawings.

The frame member or rail 23 can be of any suitable, essentially rigid construction and can support either one or more runners (not shown) or a series of bogies (not shown) or any combination thereof to guide rearward track movement.

The link means can take various forms and, in the illustrated construction includes a rigid front link 43 which is pivotally connected to the snowmobile chassis 13 in any suitable manner along axis 45 and which is pivotally connected to the rail or frame member 23 in any suitable manner adjacent to the forward end thereof along axis 47.

The link means also includes the before-mentioned rear link 33 which is also rigid and which is pivotally connected to the chassis 15 in any suitable way along axis 49 and which is connected to the rail or frame member 23 by a connection in the form of a slot 35 and pin 37. If desired, a rigid fixed link 51 can be mounted on the chassis portions 41 between the axes 45 and 49 for reinforcement of the chassis 15.

In accordance with the invention, the rear link 33 is connected to the rearward portion of the frame member or rail 23 by means affording relative pivotal movement therebetween and relative linear movement therebetween and in such manner as to minimize any fore and aft force applied by the rear link to the frame member or carrier 23. In the construction shown in FIG. 1, such means comprises the pin 37 and slot 35 with the frame member or rail 23 being provided with the slot 35 which extends fore and aft and with the rear link 33 including the pin 37 which is received in the slot 35. Of course, the rear link 33 could include the slot 35 and the pin 37 could be mounted on the frame member 23. In addition, the slot 35 could be oriented in directions other than strictly fore and aft.

The means biasing the suspension assembly 19 for movement of the suspension assembly 19 away from the chassis 15 can take curious forms. In the illustrated construction, there is provided one or more helical torsion springs 55 having a central coiled part 57 arranged generally coaxially with the axis 47 of the pivotal connection between the front link 43 and the frame member 23, together with a pair of spaced end portions 59 and 61. One end portion 59 is engaged with a bracket 60 fixed to the frame member 23 rearwardly of the pivotal connection with the front link 43 and the other end portion 61 is engaged with the front link 43 above its pivotal connection with the frame member 23. The end portions 59 and 61 are arranged so as to urge the front link 43 and the frame member 23 so as to decrease the angle A therebetween and thereby displace the suspension frame or carriage 20 including the frame member or rail 23 away from the chassis 15 and, in particular, to move the axis 47 of the pivotal connection between the front link 43 and the frame member or rail 23 away from the chassis 15.

Other spring arrangements could be employed. For instance, a spring could be arranged between the chassis 15 and either of the front link 43 or the frame member or rail 23 so as to urge the pivotal connection between the frame member or rail 23 and the front link 43 outwardly from the chassis 15.

The resilient member 31 extending forwardly from the suspension frame or carriage 20 can take various forms and, in the illustrated construction, comprises one or more transversely or laterally aligned leaf spring assemblies each including a plurality of leaf springs. The illustrated leaf spring assembly is anchored at the rear end thereof to the frame member or rail 23. Each leaf spring assembly has a lower surface 71 which is adapted to guide the endless belt or track 21 and which curves upwardly and forwardly. The leaf springs are designed so as to be under loading under all positions of the suspension assembly 19 relative to the snowmobile chassis 15.

In order to guide the endless track 21 from the rear of the frame member 23 to the drive sprocket 17, two arcuate surfaces are provided. One arcuate surface is provided by one or more transversely spaced idlers 75 mounted for rotation at the rearward end of the frame member or rail 23. The other arcuate surface is provided by one or more idlers 77 rotatably mounted coaxially with the pivotal connection of the rear link 33 to the chassis 15. Other arrangements for guiding the endless belt 21 for travel from the rear of the frame member or rail 23 to the drive sprocket 17 can also be employed.

As already indicated, the invention is not limited to a track driving arrangement employing a drive sprocket 17 forwardly of the track suspension assembly 19.

In operation, the resilient member 31 is preferably under tension regardless of the position of the suspension assembly 19 relative to the chassis 15. Use of the preloaded resilient member 31 or leaf spring assembly serves to maintain tension in the track 21 during movement of the suspension assembly 19 relative to the chassis 15 and under varying temperature conditions which can sometimes affect the length of the endless track 21. In addition, the resilient member 31 will normally encounter an obstacle or rough terrain prior to the frame member 23. Thus, initial impact of such obstacle or rough terrain with the suspension assembly 19 is cushioned by the resilience of the resilient member 31 and movement of the frame member 23 is initiated toward a position accommodating travel past the obstruction or rough terrain before engagement with the obstruction.

Shown in FIGS. 3 and 4 is another arrangement or means for connecting a rear link 133 to the rearward portion of one rail 123 of a suspension frame or carriage 120 forming a part of a suspension assembly 119 so as to afford both relative pivotal and linear movement between the suspension frame or carriage 120 and the link 133 and so as to substantially minimize or reduce transmission of force in the horizontal direction to the suspension frame or carriage 120. In the construction shown in FIG. 3 and 4, such means comprises pivotal connection of the link 133 to a block 151 slidable on the rail 123 of the suspension frame or carriage 120.

More specifically, the rail 123 is formed by two longitudinally extending channel shaped members 153 each having a web 155 and upper and lower flanges 157 and 159 respectively. The channel shaped members 153 are connected together to provide rigidity by welding or otherwise joining or securing together the webs 155. Fixed to the lower flanges 159 is a suitable skid 161 which is preferably constructed of plastic material and which is adapted to engage a track 121.

While various constructions can be employed, in the disclosed construction, the block 151 comprises an extruded metallic member which generally has an H-shaped formation including a horizontal web 165 and respective upstanding legs 167 and 169 extending from the ends of the web 165. In addition, a pair of inturned flanges 171 and 173 project toward each other from the lower ends of the legs 167 and 169 and terminate in spaced relation to each other at a spacing which is greater than the overall distance between the outer ends of the upper flanges 157 of the rail 123. The inturned flanges 171 and 173 of the block 151, together with the web 165 and legs 167 and 169, constitute a recess or guideway 175 for a member or guide 177 which can be constructed in various ways and which, in the disclosed construction is preferably constructed of extruded plastic. The guide or member 177 includes a horizontal bar portion 179 and two inturned end portions 181 and 183 which are horizontally spaced at a distance greater than the overall width of the upper flanges 157 of the rail 123 and which, together with the bar portion 179, provide two horizontally spaced slots 185 and 187 for receiving a metal reinforcing member 191 (still to be described).

Located between the slide or member 177 and the block 151 is a wear plate 201 which has upturned ends 203 to insure travel of the wear plate 201 longitudinally of the guide or member 177 in common with the block 151 and which is preferably fabricated of stainless steel, although other materials having good wear characteristics and rust resistance can also be employed.

The previously mentioned reinforcing member 191 has a width in excess of the overall width of the upper flanges 157 of the rail 123 and is welded or otherwise suitably secured to the rail 123 for reinforcement thereof with the side margins or edges 205 of the member 191 in outwardly extending or overhanging relation to the upper flanges 157 of the rail 123. In assembly, the wear plate 201 is located in the block 151, after which the guide or member 177 is inserted into the recess or guideway 175 in the block 151. The block 151 with the wear plate 201 and the guide or member 177 is then moved relative to the rail 123 so as to cause the side margins 205 of the reinforcing member 191 to enter into the spaced slots 185 and 187 in the guide or member 177.

Means are provided for fixing the guide or member 177 to the reinforcing member 191 and, therefore, to the rail 123 when the guide or member 177 is properly located in the fore and aft direction relative to the reinforcing member 191 and rail 123. While other constructions could be employed, in the illustrated construction a pair of rivets 211 are employed. In this regard the channel shaped members 153 are formed at 213 to provide for clearance for the bottom heads of the rivets 211 and the plastic material of the guide or member 177 is provided with a pair of recesses 215 which receive the top heads of the rivets 211 in such manner as to avoid interference with movement of the block 151 relative to the member or guide 177.

Any suitable means can be employed to pivotally connect the block 151 to the link 133. In the illustrated construction, the link 133 includes an apertured end portion 221 which extends between the legs 167 and 169 of the block 151 and which receives a sleeve 223 which also extends into apertures in the legs 167 and 169 of the block 151. Extending through the sleeve 223 is a bolt 225 which prevents axial movement of the sleeve 223. Thus, pivotal movement of the link 133 relative to the block 151 is provided.

In operation, the link 133 is pivotal relative to the block 151, and the block 151 is slidable relative to the guide or member 177 fixed on the rail 123. As a consequence, vertical forces are transmitted between the link 133 and the rail 123, but the only horizontal force transmitted between the link 133 and the rail 123 results from friction occurring incident to relative sliding between the block 151 and the rail 123. In the disclosed construction, such friction forces are greatly reduced as compared to the horizontal forces which could otherwise be transmitted if the link 133 were pivotally connected to the rail 123 without provision for slidable movement between the link 133 and the rail 123. Specifically, the frictional force occurring incident to sliding movement of the block 151 relative to the rail 123 is believed to be less than about one-tenth of the horizontal force which would be transmitted in the case of a pure pivotal connection.

While the constructions illustrated in FIGS. 1 and 3 show a sliding connection between the bottom of the rear link and the carriage or suspension frame, at least some of the advantages of the invention can also be obtained by employing a sliding connection between the top of the rear link and the snowmobile chassis or between the front link and either of the suspension frame or carriage and the snowmobile chassis.

Various of the features of the invention are set forth in the following claims.

What is claimed is:

1. A track suspension comprising a chassis, a track suspension assembly including a suspension frame member, a resilient member extending forwardly from said frame member from adjacent the forward end thereof, link means connecting said frame member to said chassis for movement of said frame member relative to said chassis, means biasing said suspension assembly for movement of said frame member away from said chassis, and a track supported, in part, by said track suspension assembly in engagement with said resilient member.

2. A track suspension in accordance with claim 1 wherein said frame member includes forward and rearward portions, and wherein said link means includes a front link pivotally connected to said chassis and pivotally connected to said forward portion of said frame member, a rear link pivotally connected to said chassis, and means connecting said rear link to said rearward portion of said frame member for relative pivotal movement therebetween and relative linear movement therebetween.

3. A track suspension system in accordance with claim 2 wherein said means connecting said rear link to said rearward portion of said frame member comprising a slot in one of said rear link and said rearward portion of said frame member and a pin projecting in said slot and extending from the other of said rear link and said rearward portion of said frame member.

4. A track suspension in accordance with claim 3 wherein said slot extends in the fore and aft direction.

5. A track suspension in accordance with claim 1 wherein said resilient member comprises a leaf spring connected at its rearward end to said frame member adjacent the forward end thereof.

6. A track suspension in accordance with claim 1 wherein said resilient member extends arcuately upwardly and forwardly from said frame member.

7. A track suspension in accordance with claim 1 wherein said resilient member extends forwardly of said link means.

8. A track suspension in accordance with claim 1 wherein said link means includes a link pivotally connected to said chassis, and means connecting said link to said frame member for relative pivotal movement therebetween and relative linear movement therebetween.

9. A track suspension comprising a chassis, a track suspension assembly including a suspension frame, a resilient member extending forwardly from said suspension frame from adjacent the forward end thereof, and means connecting said suspension frame to said chassis for movement of said suspension frame relative to said chassis and including a link and means connected between said link and one of said chassis and said suspension frame for providing both relative pivotal and relative linear movement between said link and the connected one of said chassis and said suspension frame, means biasing said suspension assembly for movement of said suspension frame away from said chassis, and a track supported, in part, by said track suspension assembly in engagement with said resilient member.

10. A track suspension in accordance with claim 9 wherein said means connected between said link and one of said chassis and said suspension frame includes a slot in said suspension frame and a pin projecting in said slot and extending from said link.

11. A track suspension in accordance with claim 10 wherein said link comprises a rear link.

12. A track suspension comprising a chassis, a track suspension assembly including a suspension frame, and means connecting said suspension frame to said chassis for movement of said suspension frame relative to said chassis and including a link pivotally connected to said chassis, a guide on said suspension frame, a block slidable on said guide, a pivotal connection between said link and said block whereby to provide both relative pivotal and relative linear movement between said link and said suspension frame, and means biasing said suspension assembly for movement of said suspension frame away from said chassis.

13. A track suspension in accordance with claim 12 wherein said link comprises a rear link.

14. A track suspension comprising a chassis, a track suspension assembly including a suspension frame, and means connecting said suspension frame to said chassis for movement of said suspension frame relative to said chassis and including a link pivotally connected to one of said chassis and said suspension frame, a guide on the other of said chassis and said suspension frame, a block slidable on said guide, and a pivotal connection between said link and said block, whereby to provide both relative pivotal and relative linear movement between said link and said guide, and means biasing said suspension assembly for movement of said suspension frame away from said chassis.

15. A track suspension in accordance with claim 14 wherein said link comprises a rear link.

* * * * *